United States Patent
Zhang et al.

(10) Patent No.: US 9,847,525 B2
(45) Date of Patent: Dec. 19, 2017

(54) LITHIUM NICKEL COBALT MANGANESE OXIDE POSITIVE ACTIVE MATERIAL HAVING CONCENTRATION GRADIENT OF NICKEL, COBALT, AND MANGANESE AND PRECURSOR THEREOF AND PREPARATION METHODS

(71) Applicant: SHANGHAI PYLON TECHNOLOGY CO., LTD., Shanghai (CN)

(72) Inventors: Jun Zhang, Shanghai (CN); Jian Guo, Shanghai (CN); Lianqi Zhang, Shanghai (CN); Ruijuan Yang, Shanghai (CN); Peiyu Hou, Shanghai (CN)

(73) Assignee: Hubei ZTE Advanced Materials Co., Ltd., Hubei (CN)

( * ) Notice: Subject to any disclaimer, the term of this patent is extended or adjusted under 35 U.S.C. 154(b) by 402 days.

(21) Appl. No.: 14/355,537

(22) PCT Filed: Oct. 26, 2012

(86) PCT No.: PCT/CN2012/083619
§ 371 (c)(1),
(2) Date: Apr. 30, 2014

(87) PCT Pub. No.: WO2013/064038
PCT Pub. Date: May 10, 2013

(65) Prior Publication Data
US 2014/0272590 A1    Sep. 18, 2014

(30) Foreign Application Priority Data
Oct. 31, 2011    (CN) .......................... 2011 1 0338824

(51) Int. Cl.
*H01M 4/36* (2006.01)
*H01M 4/525* (2010.01)
(Continued)

(52) U.S. Cl.
CPC ......... *H01M 4/366* (2013.01); *H01M 4/0402* (2013.01); *H01M 4/1391* (2013.01);
(Continued)

(58) Field of Classification Search
CPC ...... H01M 4/366; H01M 4/525; H01M 4/505; H01M 4/0402; H01M 4/1391
(Continued)

(56) References Cited

U.S. PATENT DOCUMENTS

2010/0316910 A1    12/2010    Kajiyama et al.

FOREIGN PATENT DOCUMENTS

| CN | 1622371 A | 6/2005 |
| CN | 102054985 A | 5/2011 |
| CN | 102368548 A | 3/2012 |

OTHER PUBLICATIONS

Lee et al., Synthesis and electrochemical performances of core-shell structured Li[(Ni1/3Co1/3Mn1/3)0.8(Ni1/2Mn1/2)0.2]O2 cathode material for lithium ion batteries, Feb. 2010, Journal of Power Sources, 195, 6043-6048.*
(Continued)

*Primary Examiner* — Sean P Cullen
(74) *Attorney, Agent, or Firm* — Baker Hostetler LLP

(57) ABSTRACT

A precursor of a modified ternary material for a lithium ion battery positive material belongs to the technical field of application of lithium ion battery positive materials. A molecular formula of the precursor is: $(Ni_{1/3}Co_{1/3}Mn_{1/3})(OH)_2$, and the precursor consists of three layers. An inner layer of the precursor is a ternary material with the Co content of more than ⅓ and equal Ni and Mn content, and
(Continued)

the molecular formula of the inner layer of the precursor is: $(Ni_{1/3-x}Co_{1/3+2x}Mn_{1/3-x})(OH)_2$, where $0<x<1/3$. An outer layer of the precursor is a ternary material with the Co content of greater than 0 to 1/3 and equal Ni and Mn content, and the molecular formula of the outer layer of the precursor is: $(Ni_{0.5-y}Co_{2y}Mn_{0.5-y})(OH)_2$, where $0<y<1/6$. An intermediate layer of the precursor is a concentration gradient composite material of the two materials of the inner layer and the outer layer of the precursor. The modified ternary material containing the precursor has the chemical formula of $Li(Ni_{1/3}Co_{1/3}Mn_{1/3})O_2$. The inside of each microscopic particle of the ternary material consists of three parts, namely, an inner layer, an intermediate layer and an outer layer. The present invention effectively improves the cyclic stability, thermal stability and compacted density, and has a high cost-performance advantage.

7 Claims, 4 Drawing Sheets

(51) Int. Cl.
*H01M 4/505* (2010.01)
*H01M 4/04* (2006.01)
*H01M 4/1391* (2010.01)
*H01M 10/0525* (2010.01)

(52) U.S. Cl.
CPC ........... *H01M 4/505* (2013.01); *H01M 4/525* (2013.01); *H01M 10/0525* (2013.01); *H01M 2220/20* (2013.01); *H01M 2220/30* (2013.01)

(58) Field of Classification Search
USPC .......... 429/223, 231.3; 252/182.1; 427/126.6
See application file for complete search history.

(56) References Cited

OTHER PUBLICATIONS

Yang-Kook Sun et al., "High-energy cathode material for long-life and safe lithium batteries", Nature Materials, vol. 8, Apr. 2009, pp. 320-324, Macmillan Publishers Limited 2009.

\* cited by examiner

LITHIUM NICKEL COBALT MANGANESE OXIDE POSITIVE ACTIVE MATERIAL HAVING CONCENTRATION GRADIENT OF NICKEL, COBALT, AND MANGANESE AND PRECURSOR THEREOF AND PREPARATION METHODS

CROSS-REFERENCE TO RELATED APPLICATIONS

This application is a National Stage of International Patent Application No. PCT/CN2012/083619, filed Oct. 26, 2012 and claims priority to foreign application CN 201110338824.6, filed Oct. 31, 2011, the contents of which are incorporated herein by reference in their entirety.

TECHNICAL FIELD

The present invention belongs to the technical field of lithium ion battery positive electrode materials, and in particular, relates to a positive electrode material for a lithium ion battery and a precursor thereof, and preparation processes for the positive electrode material and the precursor thereof.

BACKGROUND ART

Energy issues are key issues which concern the sustainable development of China, and it is an important national policy of the country currently to seek and develop alternative secondary energies. Lithium ion batteries are high-energy batteries which have been developed rapidly in the past decade, and now have already become an emphasis direction of the new energy industry development of China as they have a high voltage, a high specific energy, a long cycle period, low environmental pollution and other advantages. A positive electrode material is an important constituent part of a lithium ion battery, and is also a part with the highest proportion of the cost in a lithium ion battery.

As a new lithium ion battery positive electrode material, $LiNi_{1/3}Co_{1/3}Mn_{1/3}O_2$ has overall electrochemical properties superior to single-component oxides, such as, $LiCoO_2$, $LiNiO_2$ and $LiMnO_2$ due to the synergistic effect of nickel, cobalt and manganese. In addition, since $LiNi_{1/3}Co_{1/3}Mn_{1/3}O_2$ has a stable structure and good thermal stability, and has low costs and low toxicity compared with $LiCoO_2$, the ternary material is a lithium ion battery positive electrode material which is considered to be capable of widely replacing $LiCoO_2$ to be applied to small-sized lithium ion batteries, and is very likely to be applied to an EV and a HEV as a power battery material, and the material has become a hot spot of lithium ion battery researches around the world.

Contents of the Invention

Aiming at the need of improving the properties of existing ternary positive electrode materials for lithium ion batteries, an object of the present invention is to provide a modified ternary material and a precursor thereof, achieving the effective enhancement of the cycle stability, thermal stability and compacted density of a ternary material by adjusting the components and upgrading the production process technologies, on the basis of not increasing the production and material costs.

Another object of the present invention is to provide a process for preparing the modified ternary material and the precursor thereof mentioned above; the preparation technology for the precursor of a lithium ion battery positive electrode material provided in the present invention changes the prior preparation process with a single salt solution, and increases the ratio of the cobalt element in the beginning stage, enabling the microscopic structure inside the material to be more compact, while the material grows following the original crystal structure in the course of gradually changing the salt solution components, increasing the compactness of the material; and at the same time, the migration rate of lithium ions inside the material is increased. As external nickel and manganese elements increase, partial $Ni_{0.5}Mn_{0.5}$ structure is formed, effectively enhancing the cycle stability and thermal stability of the modified ternary material.

In order to solve the technical problems mentioned above, the technical solutions involved in the present invention are as follows:

A precursor of a modified ternary material for a lithium ion battery positive electrode material has a composition of the following molecular formula: $Ni_{1/3}Co_{1/3}Mn_{1/3}(OH)_2$; and consists of three layers, wherein an inner layer of the precursor is a ternary material with a cobalt content of greater than ⅓ and identical nickel and manganese contents, and the molecular formula of said inner layer of the precursor is: $(Ni_{1/3-x}Co_{1/3+2x}Mn_{1/3-x})(OH)_2$, where $0<x\le ⅓$; an outer layer of the precursor is a ternary material with a cobalt content of 0 to ⅓ and equal nickel and manganese contents, and the molecular formula of said outer layer of the precursor is: $(Ni_{0.5-y}Co_{2y}Mn_{0.5-y})(OH)_2$, where $0\le y<⅙$; and an intermediate layer of the precursor is a concentration-gradient composite material of the above two materials of the inner layer and the outer layer of the precursor.

A process for preparing the precursor of a modified ternary material for a lithium ion battery positive electrode material of the present invention has the particular steps of:

(1) adding a ternary salt solution A of nickel, cobalt and manganese into a reaction kettle at a certain rate, wherein the molar ratio of Ni:Co:Mn=(⅓−x):(⅓+2x):(⅓−x), where $0<x\le ⅓$), carrying out a coprecipitation reaction with an alkali solution to obtain a solid-liquid mixture, the molecular formula of the precipitated solid being $(Ni_{1/3+x}Co_{1/3+2x}Mn_{1/3-x})(OH)_2$, where $0<x\le ⅓$, so as to form an inner layer part of the precursor;

(2) in the following course of injecting the ternary salt solution A of nickel, cobalt and manganese and a ternary salt solution B of nickel, cobalt and manganese, adjusting the flow rate of the alkali solution at any time to keep the pH value of the solution in the reaction kettle between 10-12;

first, continuing the addition of the ternary salt solution A of nickel, cobalt and manganese into the reaction kettle at a decreasing rate with a decrement of 100-1,000 ml per hour and at the same time, gradually adding the ternary salt solution B of nickel, cobalt and manganese with the same total molar ratio concentration into the reaction kettle at an increasing rate with an increment of 100-1,000 ml per hour from zero, wherein the molar ratio of Ni:Co:Mn=(0.5−y):2y:(0.5−y), where $0\le y<⅙$; so as to form an intermediate layer part of the above precursor which connects the inner layer and the outer layer and has a concentration gradient in the precursor;

(3) when the injection speed of the ternary salt solution A of nickel, cobalt and manganese has decreased to zero, continuing the injection of the solution B until the complete injection into the reaction kettle with a constant speed at a certain rate, so as to form an outer layer of the precursor coated outside of the intermediate layer part of the precursor mentioned above; and (4) separating the solid-liquid mixture after the reaction in step (3) is completed by means of centrifugal filtration, washing the same to be neutral, and oven-drying the same at 60° C.-200° C. for 4-10 h; the general molecular formula of the precipitated solid obtained being $(Ni_{1/3}Co_{1/3}Mn_{1/3})(OH)_2$, and the precipitated solid being the precursor of a modified ternary material.

On the one hand, said ternary salt solution A of nickel, cobalt and manganese and said ternary salt solution B of nickel, cobalt and manganese have the same total molar ratio concentration, and the volume ratio of the two injected into the reaction kettle is 1 to 10.

A modified ternary material for a lithium ion battery positive electrode material of the present invention has the precursor mentioned above.

A process for preparing a modified ternary material for a lithium ion battery positive electrode material of the present invention is preparing the product by crushing the precursor mentioned above, mixing the same with a lithium source and calcining, that is to say, mixing the powder of said precursor with a lithium source and calcining at 300° C.-1,200° C. for 8-30 h to form a modified ternary material.

Further, the process is as follows: first, obtaining a precursor of a modified ternary material with the general molecular formula of the precipitated solid of $(Ni_{1/3}Co_{1/3}Mn_{1/3})(OH)_2$ according to the preparation process for a precursor of claim 2; and then, after mixing well the above precursor with a lithium source at a molar ratio of 1:1 to 1:1.2, subjecting the same to multi-stage calcination in a muffle furnace, with the calcination temperature of 300° C.-1,200° C. and the calcination time of 8-30 h, and after the multi-stage calcination, cooling, crushing and sieving to obtain a modified ternary material.

Compared with the prior art, the beneficial effects of the present invention are as follows:

For the modified ternary material and the precursor thereof provided in the present invention, on the premise of not increasing the preparation cost of a ternary material, according to the combinations of different composition proportions and different volume amounts used of the ternary salt solution A of nickel, cobalt and manganese and the ternary salt solution B of nickel, cobalt and manganese, a modified $LiNi_{1/3}Co_{1/3}Mn_{1/3}O_2$ the precursor of which has different internal structure is obtained. Compared with the $LiNi_{1/3}Co_{1/3}Mn_{1/3}O_2$ material with a homogeneous internal structure, the series of the modified ternary materials have a similar discharge specific capacity, a higher tap density, and better cycle stability and safety performance, and the rate performance of some materials is also enhanced relatively largely, having an significant cost-performance advantage, and being more suitable for the application on a power battery.

DESCRIPTION OF DRAWINGS

FIG. 5-1 is an electron micrograph of the modified ternary material of Example 2 of the present invention;

FIG. 5-2 is an electron micrograph of Comparative example 2; and

PARTICULAR EMBODIMENTS

The present invention is described in detail hereinafter by means of embodiments, and the embodiments are provided for easy understanding, and limit by no means the present invention.

COMPARATIVE EXAMPLE 1

27.5 L of a nickel, cobalt and manganese salt solution with a concentration of 2 M was prepared, wherein the molar ratio of nickel:cobalt:manganese is 1:1:1.

The prepared salt solution mentioned above was injected at a speed of 1 L/h into a reaction kettle with a rotation speed of 200 rps, and simultaneously a 6 M NaOH solution was injected therein, and the flow rate of the alkali solution was adjusted to keep the pH value between 10 and 11. After 27.5 h, the salt solution was completely injected into the reaction kettle, and the reaction for preparing a precursor was completed. The solid-liquid mixture after the reaction was completed was separated by centrifugation, washed to be neutral and then oven-dried at 100° C. for 10 h. The oven-dried precursor was mixed well with lithium carbonate according to a molar ratio of 1:1.05, and then calcined in a muffle furnace at 900° C. for 10 h, and the material calcined was crushed and sieved to obtain a ternary material of homogeneous $LiNi_{1/3}Co_{1/3}Mn_{1/3}O_2$.

EXAMPLE 1

25 L of a 2 M nickel, cobalt and manganese salt solution A was prepared, in which the molar ratio of nickel:cobalt:manganese was 0.315:0.37:0.315; and 2.5 L of a 2 M nickel and manganese salt solution B was prepared, in which the molar ratio of nickel:manganese was 0.5:0.5.

The salt solution A was injected at a speed of 1 L/h into a reaction kettle with a rotation speed of 200 rps, and a 6 M NaOH solution was injected simultaneously, the flow rate of the alkali solution was adjusted, and the pH value was kept by means of an on-line pH value controller between 10 and 11. After the reaction had been carried out for 24 h, the injection speed of the salt solution A was decreased at a speed of 0.5 L/h, and at the same time, the flow rate of the salt solution B was increased gradually from zero at a speed increment of 0.5 L/h; after 2 h, the salt solution A was completely injected into the reaction kettle, and the salt solution B was injected continuously into the reaction kettle at a speed of 1 L/h; after 1.5 h, the salt solution B was completely injected into the reaction kettle, and the solid-liquid mixture, after the reaction was completed, was separated by centrifugation, washed to be neutral and then oven-dried at 100° C. for 10 h to obtain a precursor with the molecular formula of $Ni_{1/3}Co_{1/3}Mn_{1/3}(OH)_2$. The oven-dried precursor was mixed well with lithium carbonate at a molar ratio of 1:1.05 and then calcined in a muffle furnace at 900° C. for 10 h, and the material calcined was crushed and sieved to obtain a modified ternary material.

Figure 1:
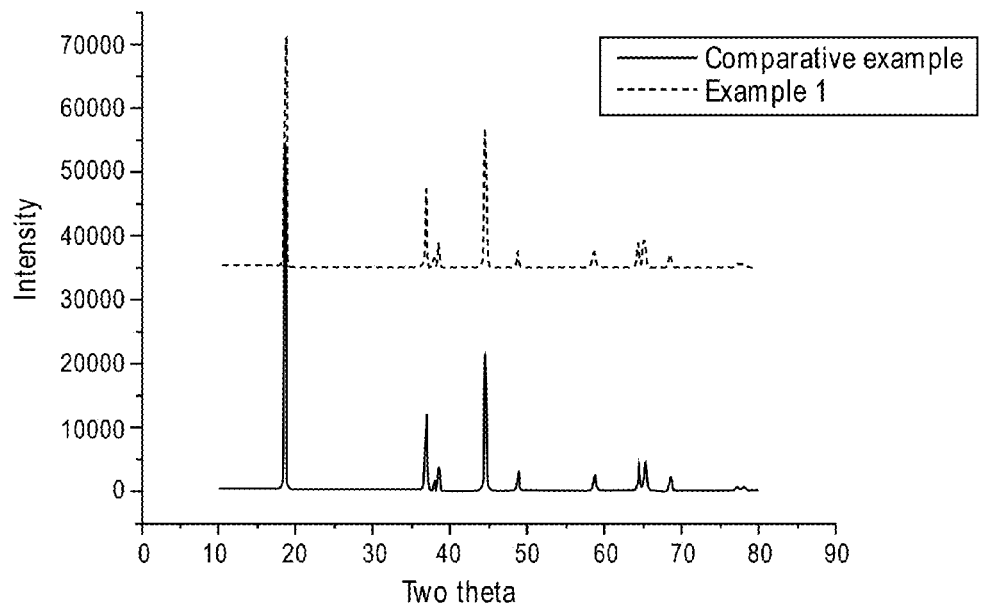
FIG. 1 is an XRD spectrum of the modified ternary material of Example 1 of the present invention and Comparative example 1.
Figure 2:
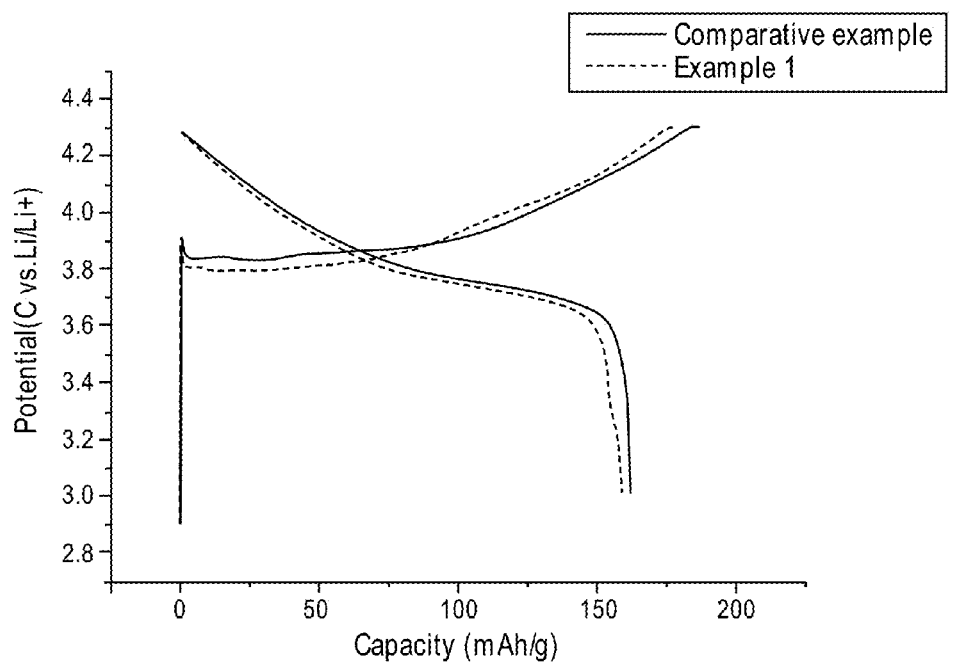
FIG. 2 is an initial charge-discharge curve diagram of the modified ternary material of Example 1 of the present invention and Comparative example 1.
Figure 3:
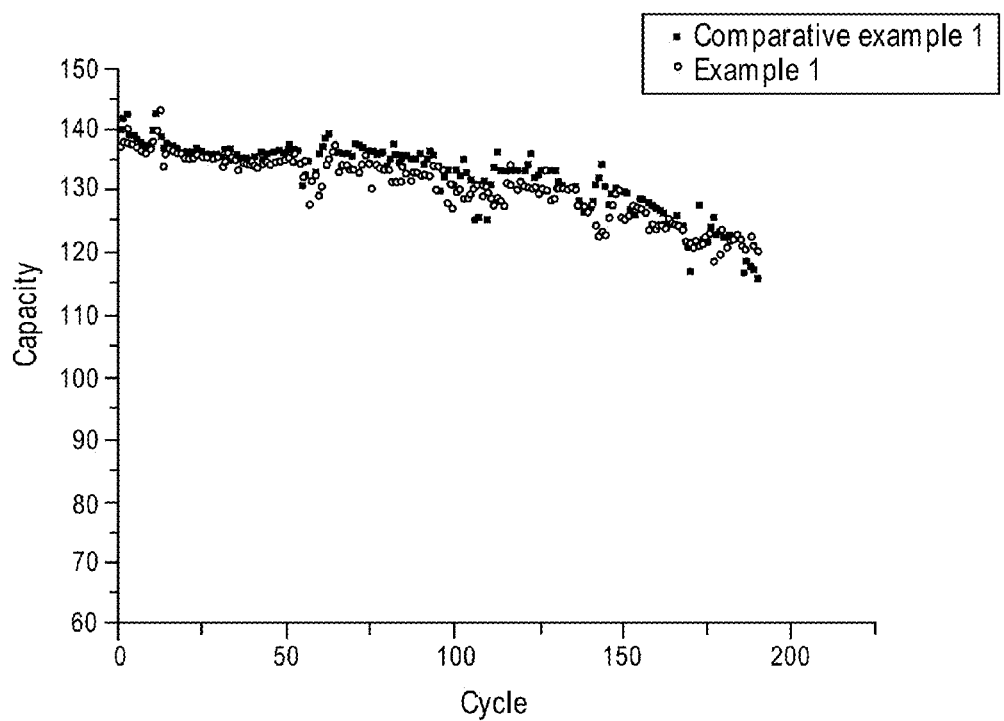
FIG. 3 is a 3.0-4.3 V cycle curve diagram of the modified ternary material of Example 1 of the present invention and Comparative example 1.
Figure 4:
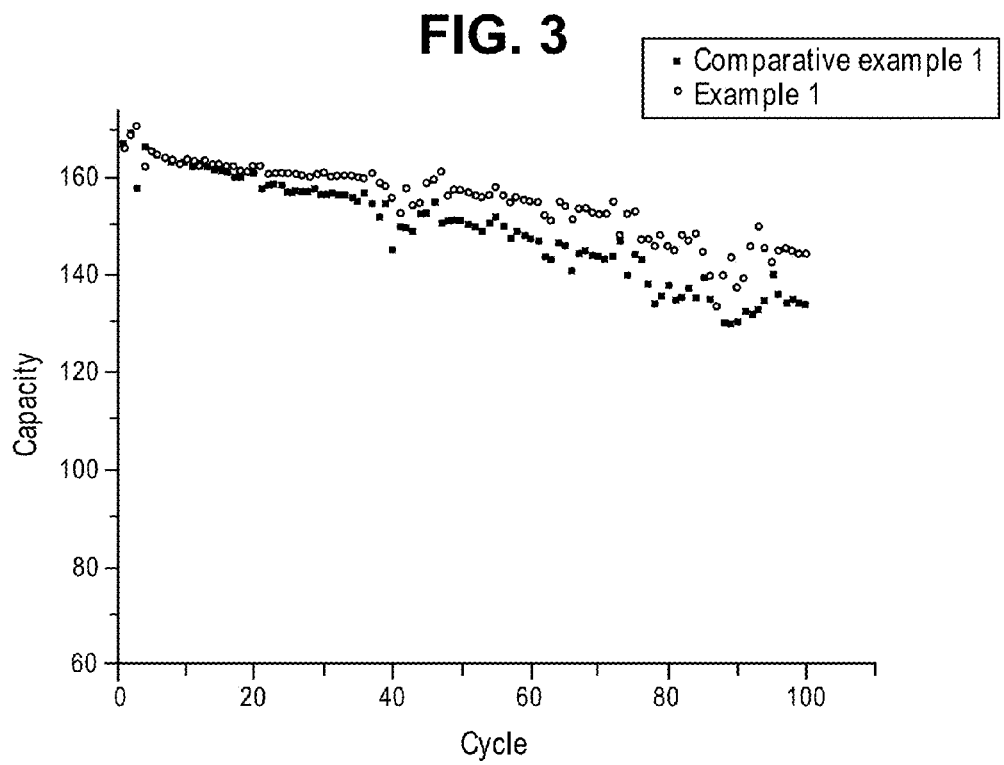
FIG. 4 is a 3.0-4.5 V cycle curve diagram of the modified ternary material of Example 1 of the present invention and Comparative example 1.

It can be seen from FIG. 1 that the XRD curves of the products obtained in Example 1 and Comparative example 1 had sharp shape, and there were no other impurity peaks by comparing the two curves, which indicated that a layered structure of the modified ternary material of Example 1 was achieved without impurity phases. The tap densities of the materials of Example 1 and Comparative example 1 were 2.48 g/cm³ and 2.40 g/cm³, respectively, the tap density of the modified ternary material was increased to a certain extent compared with the homogeneous ternary material; after the materials had been made into a 2032 button battery, the initial discharge specific capacities at 3.0-4.3 V 0.2 C were 159.1 mAh/g and 161.8 mAh/g, respectively, as shown in FIG. 2; the capacity retention rates after 200 cycles at 3.0-4.3 V 1 C were 89.43% and 84.08%, respectively, as shown in FIG. 4; and the capacity retention rates after 100 cycles at 3.0-4.5 V 1 C were 86.81% and 80.18%, respectively, as shown in FIG. 3.

It can be seen from the test data mentioned above that the other properties of the modified ternary material in Example 1 were all superior to the homogeneous ternary material except that the initial cycle performance thereof was inferior to the homogeneous ternary material with a gap of 2.7 mAh/g.

COMPARATIVE EXAMPLE 2

25 L of a nickel, cobalt and manganese salt solution with a concentration of 2 M was prepared, wherein the molar ratio of nickel:cobalt:manganese is 1:1:1.

The prepared salt solution mentioned above was injected at a speed of 1 L/h into a reaction kettle with a rotation speed of 200 rps, and a 6 M NaOH solution was injected simultaneously, the flow rate of the alkali solution was adjusted, and the pH value was kept by an on-line pH value controller between 10-11. After the reaction had been carried out for 25 h, the salt solution had been reacted completely, and so far, the reaction for preparing a precursor was completed. The solid-liquid mixture, after the reaction was completed, was separated by centrifugation, washed to be neutral and then oven-dried at 100° C. for 10 h. The oven-dried precursor was mixed well with lithium carbonate according to a molar ratio of 1:1.05, and then calcined in a muffle furnace at 900° C. for 10 h, and the material calcined was crushed and sieved to obtain a ternary material of homogeneous $LiNi_{1/3}Co_{1/3}Mn_{1/3}O_2$.

EXAMPLE 2

20 L of a 2 M nickel, cobalt and manganese salt solution A was prepared, in which the molar ratio of nickel:cobalt:manganese was 0.29:0.42:0.29; and 5 L of a 2 M nickel and manganese salt solution B was prepared, in which the molar ratio of nickel:manganese was 0.5:0.5.

The salt solution A was injected at a speed of 1 L/h into a reaction kettle with a rotation speed of 200 rps, and a 6 M NaOH solution was injected simultaneously, the flow rate of the alkali solution was adjusted, and the pH value was kept by means of an on-line pH value controller between 10-11. After the reaction had been carried out for 19 h, the injection speed of the salt solution A was decreased at a speed of 1 L/h, and at the same time, the flow rate of the salt solution B was increased gradually from zero at a speed increment of 0.5 L/h; after 2 h, the salt solution A was completely injected into the reaction kettle, and the salt solution B was injected continuously at a speed of 1 L/h into the reaction kettle; and after 4 h, the salt solution B was completely injected into the reaction kettle, and thus the reaction for preparing a precursor was completed. The solid-liquid mixture, after the reaction was completed, was separated by centrifugation, washed to be neutral and then oven-dried at 100° C. for 10 h. The oven-dried precursor was mixed well with lithium carbonate at a molar ratio of 1:1.05 and then calcined in a muffle furnace at 900° C. for 10 h, and the material calcined was crushed and sieved to obtain a modified ternary material.

Figures 1, 5:
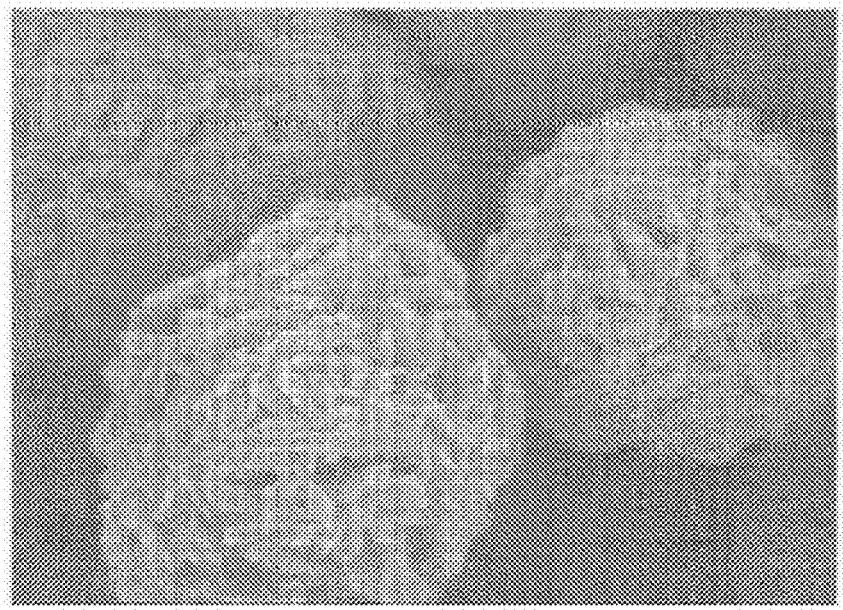
Figures 2, 5:
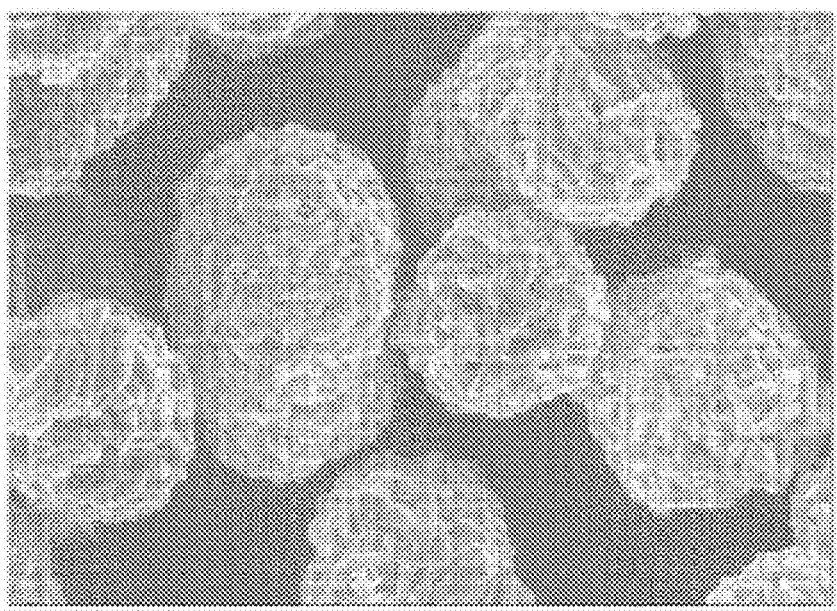
Figure 6:
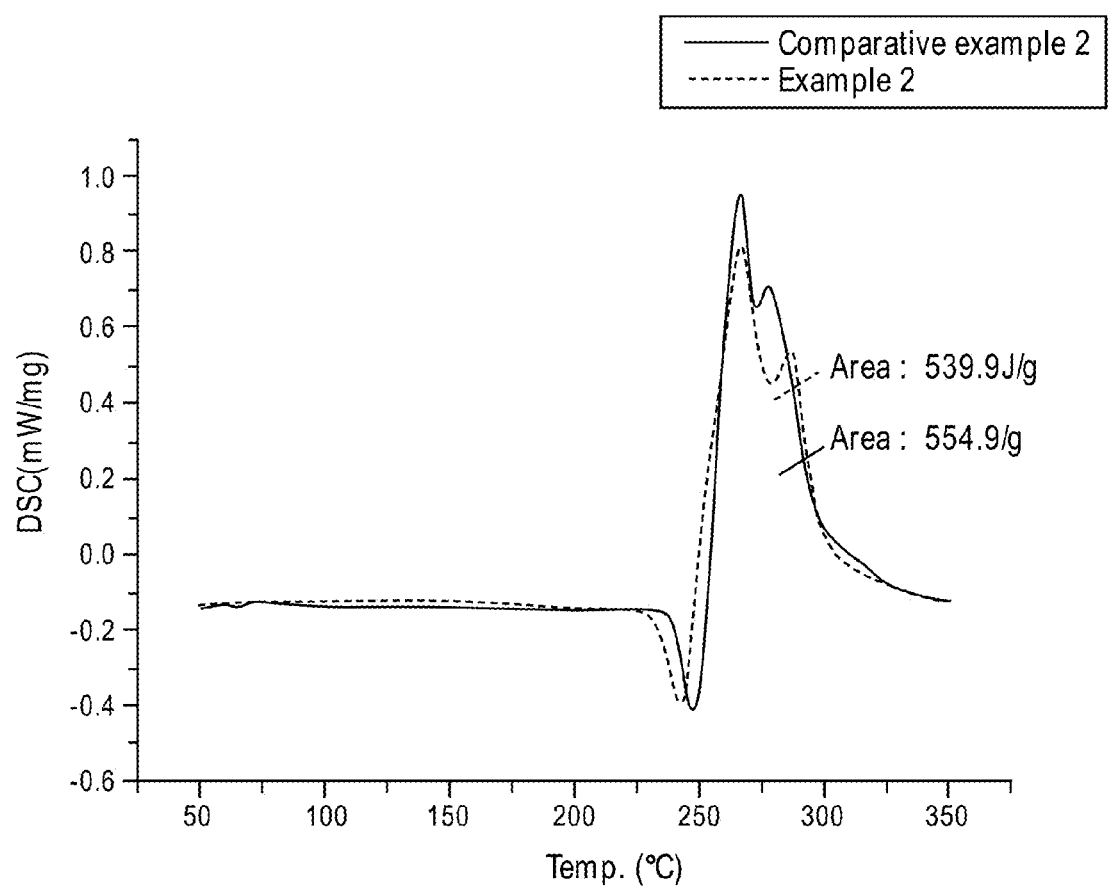
FIG. 6 is a DSC diagram of the modified ternary material of Example 2 of the present invention and Comparative example 2.

The tap densities of the materials of Example 2 and Comparative example 2 were 2.55 g/cm³ and 2.38 g/cm³, respectively, the tap density of the modified ternary material was increased to a certain extent compared with the homogeneous ternary material; and after the materials had been made into a 2032 button battery, the initial discharge specific capacities at 3.0-4.3 V 0.1 C were 154.7 mAh/g and 161 mAh/g, respectively. The capacity retention rates after 200 cycles at 3.0-4.3 V 1 C were 91.05% and 84.52%, respectively; the capacity retention rates after 100 cycles at 3.0-4.5 V 1 C were 88.93% and 80.54%, respectively; and the 4.3 V DSC decomposition temperatures were: 286° C. and 277° C. FIG. 5-1 and FIG. 5-2 are electron micrographs of Example 2 and Comparative example 2, respectively; and FIG. 6 is a DSC diagram of Example 2 and Comparative example 2.

EXAMPLE 3

20 L of a 2 M nickel, cobalt and manganese salt solution A was prepared, in which the molar ratio of nickel:cobalt:manganese was 0.3:0.4:0.3; and 5 L of a 2 M nickel, cobalt and manganese salt solution B was prepared, in which the molar ratio of nickel:cobalt:manganese was 0.45:0.1:0.45.

The salt solution A was injected at a speed of 1 L/h into a reaction kettle with a rotation speed of 200 rps, and a 6 M NaOH solution was injected simultaneously, the flow rate of the alkali solution was adjusted, and the pH value was kept by means of an on-line pH value controller between 10-11. After the reaction had been carried out for 19.5 h, the injection speed of the salt solution A was decreased at a speed of 0.1 L/h, and at the same time, the flow rate of the salt solution B was increased gradually from zero at a speed increment of 0.1 L/h; after 5 h, the salt solution A was completely injected into the reaction kettle, and the salt solution B was injected continuously at a speed of 1 L/h into the reaction kettle; and after 4.5 h, the salt solution B was completely injected into the reaction kettle, and thus the reaction for preparing a precursor was completed. The solid-liquid mixture, after the reaction was completed, was separated by centrifugation, washed to be neutral and then oven-dried at 200° C. for 4 h. The oven-dried precursor was mixed well with lithium carbonate at a molar ratio of 1:1.05 and then calcined in a muffle furnace at 900° C. for 10 h, and the material calcined was crushed and sieved to obtain a modified ternary material.

The tap densities of the materials of Example 3 and Comparative example 2 were 2.52 g/cm³ and 2.38 g/cm³, respectively, the tap density of the modified ternary material is increased to a certain extent compared with the homogeneous ternary material; and after the materials had been made into a 2032 button battery, the initial discharge specific capacities at 3.0-4.3 V 0.1 C were 158.9 mAh/g and 161 mAh/g, respectively. The capacity retention rates after 200 cycles at 3.0-4.3 V 1 C were 89.79% and 84.52%, respectively; the capacity retention rates after 100 cycles at 3.0-4.5 V 1 C were 87.04% and 80.54%, respectively; and the 4.3 V DSC decomposition temperatures were: 284° C. and 277° C.

EXAMPLE 4

17.5 L of a 2.7 M nickel, cobalt and manganese salt solution A was prepared, in which the molar ratio of nickel:

cobalt:manganese was 0.262:0.476:0.262; and 7.5 L of a 2.7 M nickel and manganese salt solution B was prepared, in which the molar ratio of nickel:manganese was 0.5:0.5.

The salt solution A was injected at a speed of 1 L/h into a reaction kettle with a rotation speed of 1,000 rps, and a 6 M NaOH solution was injected simultaneously, the flow rate of the alkali solution was adjusted, and the pH value was kept by means of an on-line pH value controller between 10-11. After the reaction had been carried out for 16.5 h, the injection speed of the salt solution A was decreased at a speed of 1 L/h, and at the same time, the flow rate of the salt solution B was increased gradually from zero at a speed increment of 1 L/h; after 2 h, the salt solution A was completely injected into the reaction kettle, and the salt solution B was injected continuously at a speed of 1 L/h into the reaction kettle; and after 6 h, the salt solution B was completely injected into the reaction kettle, and thus the reaction for preparing a precursor was completed. The solid-liquid mixture, after the reaction was completed, was separated by centrifugation, washed to be neutral and then oven-dried at 100° C. for 10 h. The oven-dried precursor was mixed well with lithium carbonate at a molar ratio of 1:1.05 and then calcined in a muffle furnace at 900° C. for 10 h, and the material calcined was crushed and sieved to obtain a modified ternary material.

The tap densities of the materials of Example 4 and Comparative example 2 were 2.55 g/cm$^3$ and 2.38 g/cm$^3$, respectively, the tap density of the modified ternary material is increased to a certain extent compared with the homogeneous ternary material; and after the materials had been made into a 2032 button battery, the initial discharge specific capacities at 3.0-4.3 V 0.1 C were 151.3 mAh/g and 161 mAh/g respectively. The capacity retention rates after 200 cycles at 3.0-4.3 V 1 C were 92.18% and 84.52%, respectively; the capacity retention rates after 100 cycles at 3.0-4.5 V 1 C were 90.93% and 80.54% respectively; the capacity retention rates after 50 cycles at 3.0-4.3 V 1 C under 55° C. were 87.05% and 84.13%, respectively; and the 4.3 V DSC decomposition temperatures were: 288° C. and 277° C., and the heat release amounts were respectively: 539.5 J/g and 554.9 J/g.

EXAMPLE 5

17.5 L of a 2 M nickel, cobalt and manganese salt solution A was prepared, in which the molar ratio of nickel:cobalt:manganese was 0.27:0.46:0.27; and 7.5 L of a 2 M nickel, cobalt and manganese salt solution B was prepared, in which the molar ratio of nickel:cobalt:manganese was 0.45:0.1:0.45.

The salt solution A was injected at a speed of 1 L/h into a reaction kettle with a rotation speed of 200 rps, and a 6 M NaOH solution was injected simultaneously, the flow rate of the alkali solution was adjusted, and the pH value was kept by means of an on-line pH value controller between 10-11. After the reaction had been carried out for 16.5 h, the injection speed of the salt solution A was decreased at a speed of 1 L/h, and at the same time, the flow rate of the salt solution B was increased gradually from zero at a speed increment of 0.5 L/h; after 2 h, the salt solution A was completely injected into the reaction kettle, and the salt solution B was injected continuously at a speed of 1 L/h into the reaction kettle; and after 6.5 h, the salt solution B was completely injected into the reaction kettle, and thus the reaction for preparing a precursor was completed. The solid-liquid mixture, after the reaction was completed, was separated by centrifugation, washed to be neutral and then oven-dried at 60° C. for 10 h. The oven-dried precursor was mixed well with lithium carbonate at a molar ratio of 1:1.05, and then calcined in a muffle furnace at 300° C. for 4 h, calcined at 800° C. for 4 h, and calcined at 1,000° C. for 20 h, and the material calcined was crushed and sieved to obtain a modified ternary material.

The tap densities of the materials of Example 5 and Comparative example 2 were 2.55 g/cm$^3$ and 2.38 g/cm$^3$, respectively, the tap density of the modified ternary material is increased to a certain extent compared with the homogeneous ternary material; and after the materials had been made into a 2032 button battery, the initial discharge specific capacities at 3.0-4.3 V 0.1 C were 154.5 mAh/g and 161 mAh/g, respectively. The capacity retention rates after 200 cycles at 3.0-4.3 V 1 C were 90.11% and 84.52%, respectively; the capacity retention rates after 100 cycles at 3.0-4.5 V 1 C were 87.79% and 80.54%, respectively; the capacity retention rates after 50 cycles at 3.0-4.3 V 1 C under 55° C. were 88.15% and 84.13%, respectively; and the 4.3 V DSC decomposition temperatures were: 287° C. and 277° C.

EXAMPLE 6

16 L of a 2 M nickel, cobalt and manganese salt solution A was prepared, in which the molar ratio of nickel:cobalt:manganese was 0.29:0.42:0.29; and 9 L of a 2 M nickel, cobalt and manganese salt solution B was prepared, in which the molar ratio of nickel:cobalt:manganese was 0.4:0.2:0.4.

The salt solution A was injected at a speed of 1 L/h into a reaction kettle with a rotation speed of 200 rps, and a 6 M NaOH solution was injected simultaneously, the flow rate of the alkali solution was adjusted, and the pH value was kept by means of an on-line pH value controller between 10-11. After the reaction had been carried out for 14 h, the injection speed of the salt solution A was decreased at a speed of 1 L/h, and at the same time, the flow rate of the salt solution B was increased gradually from zero at a speed increment of 0.25 L/h; after 4 h, the salt solution A was completely injected into the reaction kettle, and the salt solution B was injected continuously at a speed of 1 L/h into the reaction kettle; and after 7 h, the salt solution B was completely injected into the reaction kettle, and thus the reaction for preparing a precursor was completed. The solid-liquid mixture, after the reaction was completed, was separated by centrifugation, washed to be neutral and then oven-dried at 150° C. for 8 h. The oven-dried precursor was mixed well with lithium carbonate at a molar ratio of 1:1.05 and then calcined in a muffle furnace at 1,200° C. for 8 h, and the material calcined was crushed and sieved to obtain a modified ternary material.

The tap densities of the materials of Example 6 and Comparative example 2 were 2.55 g/cm$^3$ and 2.38 g/cm$^3$, respectively, the tap density of the modified ternary material is increased to a certain extent compared with the homogeneous ternary material; and after the materials had been made into a 2032 button battery, the initial discharge specific capacities at 3.0-4.3 V 0.1 C were 158.9 mAh/g and 161 mAh/g, respectively. The rate performances of the materials at 1 C and 2 C were 150.5 mAh/g and 144.7 mAh/g, and 146 mAh/g and 136 mAh/g, respectively, from which it can be seen that the rate performance of the material of Example 6 was apparently better than that of Comparative example 2. The capacity retention rates after 200 cycles at 3.0-4.3 V 1 C were 90.2% and 84.52%, respectively; the capacity retention rates after 100 cycles at 3.0-4.5 V 1 C were 88.59% and 80.54%, respectively; and the 4.3 V DSC decomposition temperatures were: 287.5° C. and 277° C.

In summary, the precursor of a modified ternary material for a lithium ion battery positive electrode material of the present invention has a molecular formula of: $Ni_{1/3}Co_{1/3}Mn_{1/3}(OH)_2$; and the precursor consists of three layers, wherein an inner layer of the precursor is a ternary material with a cobalt content of greater than ⅓ and identical nickel and manganese contents, and the molecular formula of said inner layer of the precursor is: $(Ni_{1/3-x}Co_{1/3+2x}Mn_{1/3-x})(OH)_2$, where $0<x\leq1/3$; an outer layer of the precursor is a ternary material with a cobalt content of 0 to ⅓ and equal nickel and manganese contents, and the molecular formula of said outer layer of the precursor is: $(Ni_{0.5-y}Co_{2y}Mn_{0.05-y})(OH)_2$, where $0\leq y<1/6$; and an intermediate layer of the precursor is a concentration-gradient composite material of the two materials of the inner layer and the outer layer of the above precursor. The chemical formula of the modified ternary material having the above precursor is $Li(Ni_{1/3}Co_{1/3}Mn_{1/3})O_2$, and therefore, the interior of the microscopic particles of this modified material is composed of three parts, namely, an inner layer being of a ternary material with a relatively high cobalt content and equal nickel and manganese contents; an outer layer being of a ternary material with a relatively low cobalt content or no cobalt and equal nickel and manganese contents; and an intermediate layer being of a concentration-gradient composite material of the two materials of the inner layer and the outer layer. The preparation of a modified ternary material having the above precursor is: dividing the preparation procedure into two stages for carrying out structure design and productive preparation when the precursor of a ternary material is prepared by a coprecipitation method, i.e., after the precursor material prepared is washed and oven-dried, mixing the same with a lithium source and calcining, and cooling to obtain a modified ternary positive electrode material. Compared with the $LiNi_{1/3}Co_{1/3}Mn_{1/3}O_2$ material with a homogeneous internal structure, in addition to having a similar discharge specific capacity, the modified $LiNi_{1/3}Co_{1/3}Mn_{1/3}O_2$ material having a precursor with different internal structures has a higher tap density, and better cycle stability and safety performance, and the rate performance of the material is also increased largely, having an apparent cost-performance advantage, and being more suitable for the application on a power battery.

Although the present invention has been described hereinabove in conjunction with the drawings, the present invention is not limited to the particular embodiments described above, the particular embodiments described above are merely illustrative and are not limitative, many variations can be made by those skilled in the art under the teaching of the present invention without departing from the purpose of the present invention, and these all fall into the protection of the present invention.

The invention claimed is:

1. A precursor of a modified ternary material for a lithium ion battery positive electrode material, wherein the precursor has a composition of the following molecular formula: $Ni_{1/3}Co_{1/3}Mn_{1/3}(OH)_2$;

and consists of three layers, wherein:

an inner layer of the precursor is a first ternary material with a first cobalt content of greater than ⅓ and identical first nickel and first manganese contents, and the molecular formula of said inner layer of the precursor is: $(Ni_{1/3-x}Co_{1/3+2x}Mn_{1/3-x})(OH)_2$, where $0<x<1/3$;

an outer layer of the precursor is a second ternary material with a second cobalt content of greater than 0 to ⅓ and equal second nickel and second manganese contents, and the molecular formula of said outer layer of the precursor is: $(Ni_{0.5-y}Co_{2y}Mn_{0.5-y})(OH)_2$, where $0<y<1/6$; and an intermediate layer of the precursor is a concentration-gradient composite material of the first ternary material of the inner layer and the second ternary material of the outer layer of the precursor.

2. A modified ternary material for a lithium ion battery positive electrode material having the precursor of claim 1.

3. A process for preparing a precursor of a modified ternary material for a lithium ion battery positive electrode material, wherein the particular steps are as follows:

(1) adding a ternary salt solution A of nickel, cobalt and manganese into a reaction kettle at a certain rate, wherein the molar ratio of Ni:Co:Mn $=(1/3-x):(1/3+2x):(1/3-x)$, where $0<x<1/3$, carrying out a coprecipitation reaction with an alkali solution to obtain a first solid-liquid mixture, the molecular formula of a first precipitated solid portion of the first solid-liquid mixture being $(Ni_{1/3-x}Co_{1/3+2x}Mn_{1/3-x})(OH)_2$, where $0<x<1/3$, so as to form an inner layer part of the precursor;

(2) adjusting a flow rate of the alkali solution during the addition of the ternary salt solution A and during an addition of a ternary salt solution B of nickel, cobalt and manganese to keep a pH value of a solution in the reaction kettle between 10-12;

first, continuing the addition of the ternary salt solution A of nickel, cobalt and manganese into the reaction kettle at a decreasing rate with a decrement of 100-1,000 ml per hour, and at the same time, adding the ternary salt solution B of nickel, cobalt and manganese into the reaction kettle at an increasing rate with a increment of 100-1,000 ml per hour from zero, wherein the molar ratio of the ternary salt solution B is Ni:Co:Mn $=(0.5-y):2y:(0.5-y)$, where $0<y<1/6$; so as to form an intermediate layer part of the above precursor which connects the inner layer and an outer layer and has a concentration gradient in the precursor;

(3) when the injection speed of the ternary salt solution A of nickel, cobalt and manganese has decreased to zero, continuing the injection of the ternary salt solution B until a predetermined amount of the ternary salt solution B has been added into the reaction kettle with a constant speed at a certain rate, so as to form the outer layer of the precursor coated outside of the intermediate layer part of the precursor; and (4) separating a second precipitated solid from a second solid-liquid mixture after the reaction in step (3) is completed by means of centrifugal filtration, washing the same to be neutral, and oven-drying the same at 60° C.-200° C. for 4-10 h; the general molecular formula of the second precipitated solid obtained being $(Ni_{1/3}Co_{1/3}Mn_{1/3})(OH)_2$, and the second precipitated solid being the precursor of the modified ternary material.

4. A process for preparing a modified ternary material for a lithium ion battery positive electrode material, wherein the modified ternary material includes a precursor that has a composition of the following molecular formula: $Ni_{1/3}Co_{1/3}Mn_{1/3}(OH)_2$;

and consists of three layers, wherein:

an inner layer of the precursor is a first ternary material with a first cobalt content of greater than ⅓ and identical first nickel and first manganese contents, and the molecular formula of said inner layer of the precursor is: $(Ni_{1/3-x}Co_{1/3+2x}Mn_{1/3-x})(OH)_2$, where $0<x<1/3$;

an outer layer of the precursor is a second ternary material with a second cobalt content of 0 to ⅓ and equal second nickel and second manganese contents, and the molecular formula of said outer layer of the precursor is: $(Ni_{0.5-y}Co_{2y}Mn_{0.5-y})(OH)_2$, where $0<y<⅙$; and an intermediate layer of the precursor is a concentration-gradient composite material of the first ternary material and the second ternary material of the inner layer and the outer layer of the precursor, and wherein the modified ternary material is prepared by crushing the precursor obtained by the preparation process for a precursor of claim 3, then mixing the same with a lithium source and calcining, wherein mixing the powder of said precursor with the lithium source and calcining at 300° C.-1,200° C. for 8-30 h forms the modified ternary material.

5. The process for preparing a modified ternary material according to claim 4, wherein said lithium source is lithium carbonate or lithium hydroxide.

6. A process for preparing a modified ternary material wherein the particular steps are as follows:

first, obtaining a precursor of a modified ternary material with a general molecular formula of $(Ni_{1/3}Co_{1/3}Mn_{1/3})(OH)_2$ and having three layers, wherein:

an inner layer of the precursor is a first ternary material with a first cobalt content of greater than ⅓ and identical first nickel and first manganese contents, and the molecular formula of said inner layer of the precursor is: $(Ni_{1/3-x}Co_{1/3+2x}Mn_{1/3-x})(OH)_2$, where $0<x<⅓$;

an outer layer of the precursor is a second ternary material with a second cobalt content of 0 to ⅓ and equal second nickel and second manganese contents, and the molecular formula of said outer layer of the precursor is: $(Ni_{0.5-y}Co_{2y}Mn_{0.5-y})(OH)_2$, where $0<y<⅙$; and an intermediate layer of the precursor is a concentration-gradient composite material of the first ternary material and the second ternary material of the of the inner layer and the outer layer of the precursor and wherein the modified ternary material is prepared by crushing the precursor obtained by the preparation process for a precursor of claim 3, then mixing the same with a lithium source and calcining, wherein mixing the powder of said precursor with the lithium source and calcining at 300° C.-1,200° C. for 8-30 h forms the modified ternary material; and wherein the mixing the precursor with the lithium source is at a molar ratio of 1:1 to 1:1.2, wherein the calcining is a multi-stage calcination in a muffle furnace, with the calcination temperature of 300° C.-1,200° C. and the calcination time of 8-30 h, and after the multi-stage calcination, cooling, crushing and sieving to obtain the modified ternary material, wherein said lithium source is lithium carbonate or lithium hydroxide.

7. A process for preparing a modified ternary material for a lithium ion battery positive electrode material, wherein the modified ternary material includes a precursor that has a composition of the following molecular formula: $Ni_{1/3}Co_{1/3}Mn_{1/3}(OH)_2$;

and consists of three layers, wherein:

an inner layer of the precursor is a first ternary material with a first cobalt content of greater than ⅓ and identical first nickel and first manganese contents, and the molecular formula of said inner layer of the precursor is: $(Ni_{1/3-x}Co_{1/3+2x}Mn_{1/3-x})(OH)_2$, where $0<x<⅓$;

an outer layer of the precursor is a second ternary material with a second cobalt content of 0 to ⅓ and equal second nickel and second manganese contents, and the molecular formula of said outer layer of the precursor is: $(Ni_{0.5-y}Co_{2y}Mn_{0.5-y})(OH)_2$, where $0<y<⅙$; and an intermediate layer of the precursor is a concentration-gradient composite material of the first ternary material and the second ternary material of the inner layer and the outer layer of the precursor, and wherein the modified ternary material is prepared by crushing the precursor, then mixing the same with a lithium source and calcining, wherein mixing the powder of said precursor with the lithium source and calcining at 300° C.-1,200° C. for 8-30 h forms the modified ternary material.

* * * * *